US012612095B2

(12) United States Patent
Yamazaki

(10) Patent No.: US 12,612,095 B2
(45) Date of Patent: Apr. 28, 2026

(54) OCCUPANT STATE DETECTION DEVICE AND COMPUTER PROGRAM

(71) Applicant: Autoliv Development AB, Vargarda (SE)

(72) Inventor: Yuki Yamazaki, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/835,563

(22) PCT Filed: Jan. 31, 2023

(86) PCT No.: PCT/JP2023/002971
§ 371 (c)(1),
(2) Date: Aug. 2, 2024

(87) PCT Pub. No.: WO2023/153267
PCT Pub. Date: Aug. 17, 2023

(65) Prior Publication Data
US 2025/0136168 A1    May 1, 2025

(30) Foreign Application Priority Data

Feb. 9, 2022    (JP) ................................. 2022-018872

(51) Int. Cl.
*B62D 1/06* (2006.01)
*G01V 3/08* (2006.01)
*G06F 3/041* (2006.01)
*G06F 3/044* (2006.01)
(52) U.S. Cl.
CPC .............. *B62D 1/06* (2013.01); *G01V 3/088* (2013.01); *G06F 3/0416* (2013.01); *G06F 3/044* (2013.01)

(58) Field of Classification Search
None
See application file for complete search history.

(56) References Cited

U.S. PATENT DOCUMENTS

2019/0389309 A1* 12/2019 Staude .................... G06F 3/044
2020/0290566 A1*  9/2020 Yamazaki .............. B60R 25/31

FOREIGN PATENT DOCUMENTS

| JP | 2015-047969 A | 3/2015 |
| JP | 2015-053123 A | 3/2015 |
| JP | 2019-043371 A | 3/2019 |
| JP | 2019-119295 A | 7/2019 |
| JP | 2019-166878 A | 10/2019 |
| KR | 10-2021-0132316 A | 11/2021 |

* cited by examiner

*Primary Examiner* — Stephen T. Reed
(74) *Attorney, Agent, or Firm* — Matthew D. Thayne; Thayne and Davis LLC

(57) ABSTRACT

The present invention provides an occupant state detection device to which a touchpad and a grip sensor are both provided and in which the grip sensor and the touchpad can operate normally and a computer program. The occupant state detection device comprises: a steering wheel having a touchpad that can be operated using electrostatic capacitance and a grip sensor that detects whether a driver is gripping a rim portion; an operation determination unit that makes an operation determination regarding whether the touchpad is being operated; and a grip determination unit that makes a grip determination regarding whether the rim portion of the steering wheel is being gripped.

9 Claims, 4 Drawing Sheets

[FIG. 1]
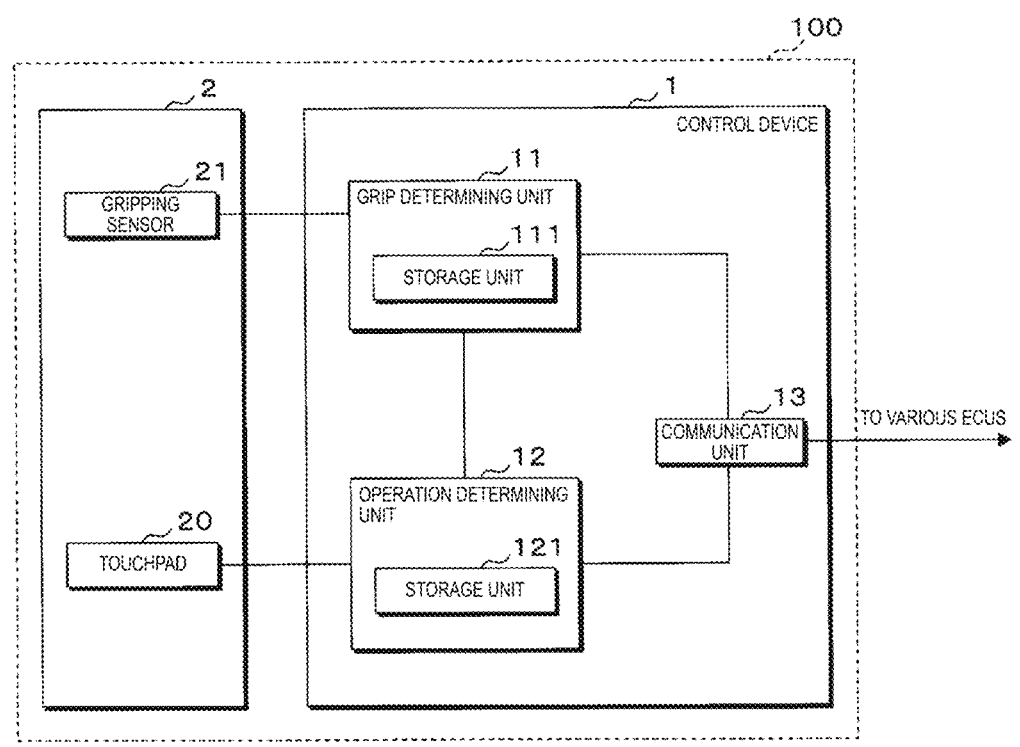
100: OCCUPANT STATE DETECTING DEVICE
1. CONTROL DEVICE
2. STEERING WHEEL
11. GRIP DETERMINING UNIT
12. OPERATION DETERMINING UNIT

[FIG. 2]
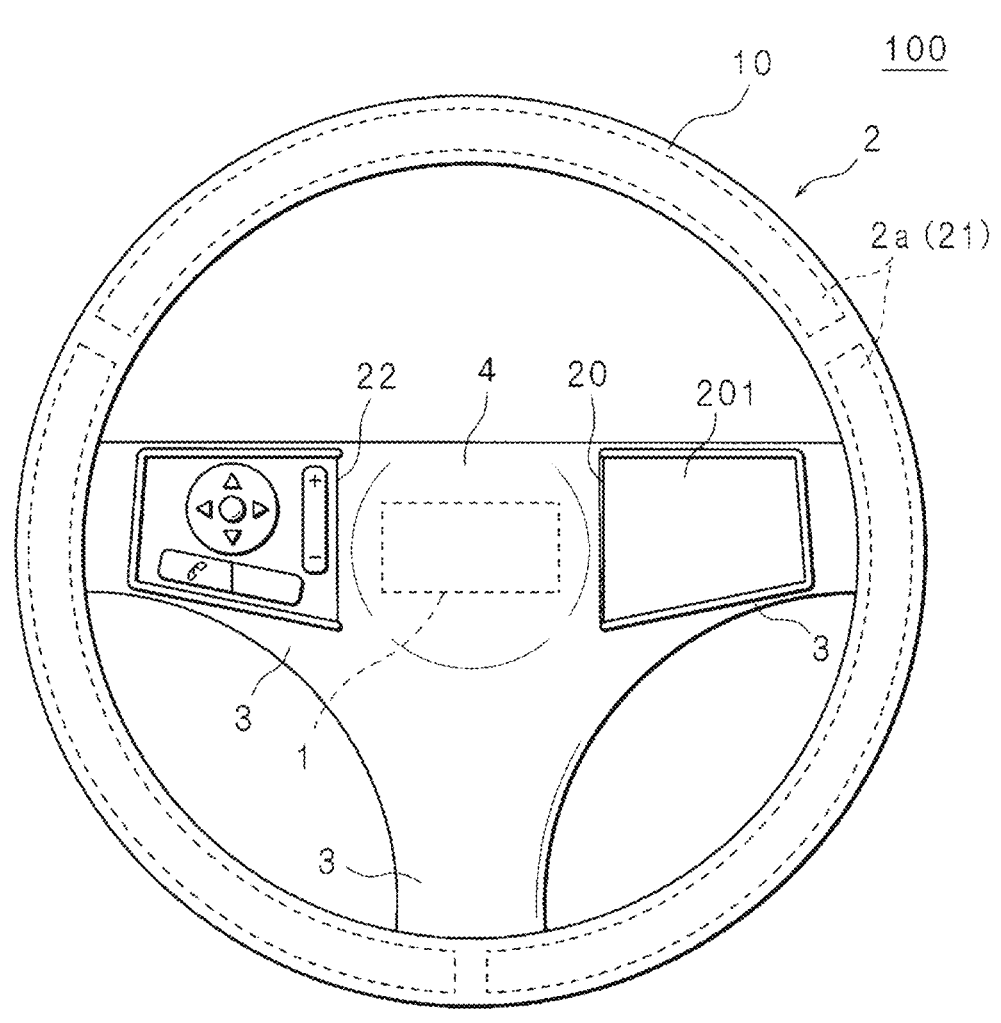

[FIG. 3]
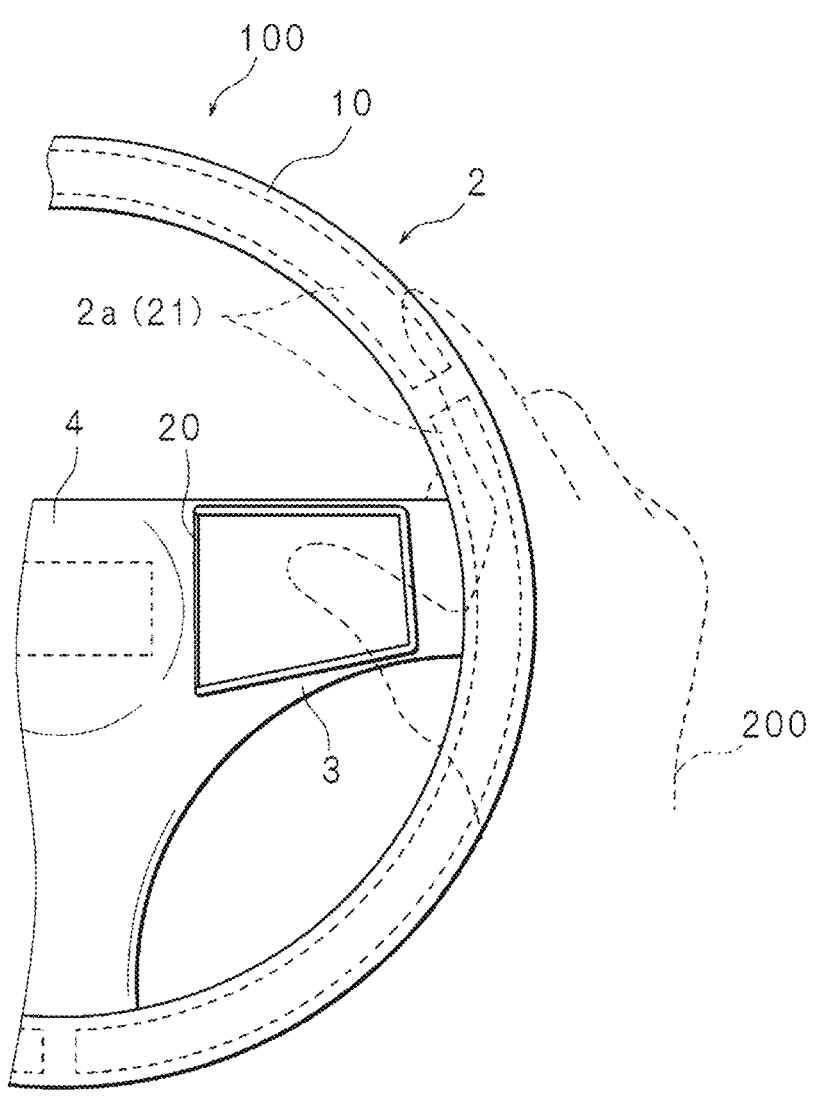

[FIG. 4]
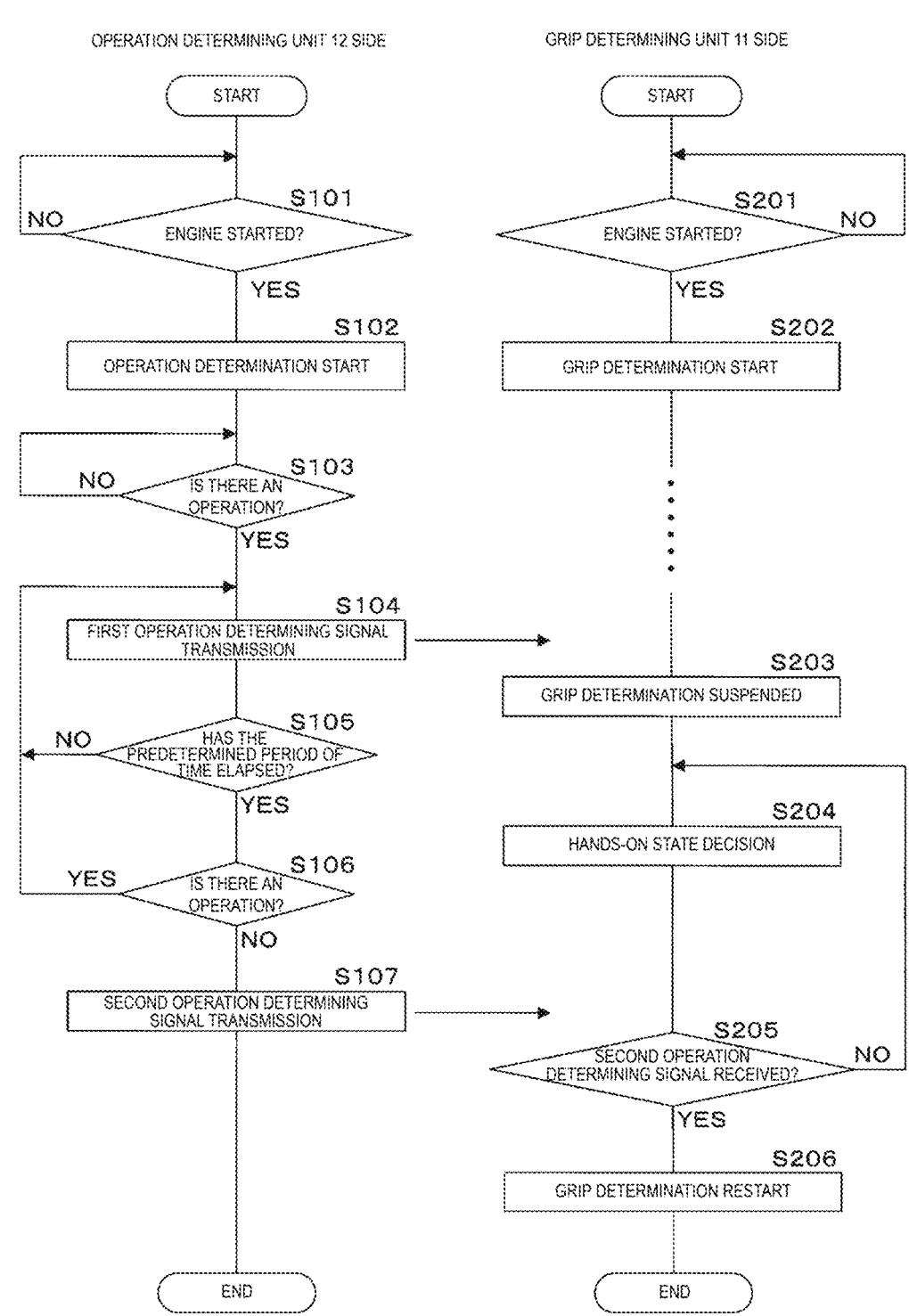

OCCUPANT STATE DETECTION DEVICE AND COMPUTER PROGRAM

TECHNICAL FIELD

The present invention relates to an occupant state detecting device and to a computer program.

BACKGROUND ART

Conventionally, steering wheels equipped with a touchpad have been widely used as a human machine interface (HMI) for a display unit provided on an instrument panel or a center console of a vehicle.

For example, Patent Document 1 discloses a steering wheel that is configured to determine an operation direction based on a start area and an end area when a tracing operation is detected across a plurality of regions defined on an operation surface of a steering wheel, and determines the operation direction by adjusting the plurality of areas depending on the gripping position of a ring portion.

RELATED ART DOCUMENTS

Patent Documents

Patent Document 1: Japanese Unexamined Patent Application Publication 2019-166878

SUMMARY OF THE INVENTION

Problem to be Solved by the Invention

There is a widely known technology that monitors the gripping state of a driver as to whether or not the driver is gripping a rim part, and executes functions such as ACC (Adaptive Auto Cruise) and LKAS (Lane Keeping Assist System) depending on the gripping state.

Furthermore, many steering wheels are provided with a gripping sensor that monitors the gripping state in addition to the aforementioned touchpad.

Therefore, with a steering wheel having both a touchpad and a gripping sensor, there may be cases where the driver operates the touchpad by fingertip while gripping the rim part. In this case, the gripping sensor provided on the rim part and the touchpad are activated simultaneously. However, if both the touchpad and the gripping sensor operate based on changes in electrostatic capacitance, the electrodes of the gripping sensor and the touchpad will be connected via the hand of the driver, which may prevent normal operation.

The steering wheel of Patent Document 1 also has both a touchpad and a gripping sensor, but Patent Document 1 does not devise a solution to this problem and is therefore unable to solve them.

In light of the foregoing, an object of the present invention is to provide an occupant state detecting device and a computer program that can prevent normal operation from being impaired when the gripping sensor and touchpad are operated simultaneously in an occupant state detection device that has both a touchpad and a gripping sensor.

Means for Solving the Problem

The occupant state detecting device of the present invention contains: a steering wheel having a touch pad operable using electrostatic capacitance and a gripping sensor for detecting whether a driver is gripping a rim part; an operation determining unit for performing an operation determination as to whether the touch pad is being operated; and a grip determining unit for performing grip determination as to whether the rim part of the steering wheel is being gripped.

In the present invention, the grip determining unit performs grip determination depending on a result of the operation determination. For example, when the operation determining unit determines that the touchpad is being operated, the grip determining unit does not perform grip determination in order to prevent interference between the operation determination and the grip determination.

The computer program of the present invention causes a computer to execute a process that performs an operation determination as to whether a touchpad operable using electrostatic capacitance provided on a steering wheel is being operated and a grip determination as to whether the rim part of the steering wheel is being gripped.

In the present invention, grip determination is performed depending on the result of the operation determination. For example, when a determination is made that the touchpad is being operated, grip determination is not performed in order to prevent interference between the operation determination and the grip determination.

Effect of the Invention

The present invention can prevent a malfunction when the gripping sensor and the touchpad are operated simultaneously in an occupant state detecting device having both a touchpad and a gripping sensor.

BRIEF DESCRIPTION OF THE DRAWINGS

FIG. 1 is a block diagram depicting an example configuration of a steering wheel device according to the present embodiment.

FIG. 2 is a front view of the steering wheel of the steering wheel device according to the present embodiment.

FIG. 3 is an illustrative diagram depicting an example of operating a touchpad in the steering wheel device of the present embodiment.

FIG. 4 is a flowchart depicting the process of operation determination and grip determination in the steering wheel device of the present embodiment.

DESCRIPTION OF THE PREFERRED EMBODIMENTS

The occupant state detecting device according to an embodiment of the present invention is described below in detail with reference to the drawings, using a steering wheel device as an example.

FIG. 1 is a block diagram depicting an example configuration of a steering wheel device 100 according to the present embodiment. The steering wheel device 100 (occupant state detecting device) includes a steering wheel 2, a control device 1, and the like. The control device 1 is communicatively connected to various ECUs, such as a driving assistance ECU that executes processes related to an advanced driving assistance system, via an in-vehicle network provided in the vehicle.

The steering wheel 2 includes a gripping sensor 21 and a touchpad 20. The gripping sensor 21 and the touchpad 20 detect electrostatic capacitance coupled to an electrode provided on the steering wheel 2, for example.

The control device 1 is provided on, for example, a steering wheel 2, and includes a grip determining unit 11, an operation determining unit 12, and a communication unit 13. The grip determining unit 11 acquires a detection value of the electrostatic capacitance detected by the gripping sensor 21, and determines whether the steering wheel 2 is in a gripped state or a non-gripped state, based on the detection value. Here, the hands-on state refers to a condition where the driver is gripping the steering wheel 2, and the hands-off state refers to a state where the driver has released and is not gripping the steering wheel 2.

The grip determining unit 11 includes a processing unit (not depicted) such as a Central Processing Unit (CPU) or a Micro Processing Unit (MPU). In addition, as described above, the grip determining unit 11 determines whether the steering wheel 2 is in a gripped state or a non-gripped state (hereinafter referred to as grip determination) based on the detection value of the electrostatic capacitance detected by the gripping sensor 21. Furthermore, as described later, the grip determining unit 11 also performs grip determination depending on whether or not the touchpad 20 is being operated by the driver.
The result of the grip determination by the grip determining unit 11 is transmitted to the driving assistance ECU or the like via a communication unit 13.

The grip determining unit 11 includes a capacitance measuring circuit (not depicted). The capacitance measuring circuit is an electric circuit for measuring a detected value of the electrostatic capacitance. The capacitance measuring circuit processes the electrical signal obtained from the gripping sensor 21 and calculates a detected value of the electrostatic capacitance. The grip determining unit 11 performs grip determination using the calculated electrostatic capacitance detection value.

In addition, the grip determining unit 11 includes a storage unit 111. The storage unit 111 includes memory elements such as Random Access Memory (RAM) and Read Only Memory (ROM), and stores programs, data, and the like necessary for the grip determining unit 11 to perform processes. In addition, the storage unit 111 temporarily stores data or the like necessary for the grip determining unit 11 to perform processes. Furthermore, the storage unit 111 stores an electrostatic capacitance threshold value used when the grip determining unit 11 performs grip determination.

The communication unit 13 is a communication interface for transmitting and receiving with other on-board devices such as various ECUs or the like via an in-vehicle network. The communication unit 13 is connected to a Local Area Network (LAN) provided in-vehicle, and transmits and receives information with other ECUs and the like. For example, the communication unit 13 transmits the result of the grip determination by the grip determining unit 11 to a driving assistance ECU or the like.

As described below, the operation determining unit 12 generates operation instructions for operating a UI (User Interface) displayed on a display unit provided on a HUD (Head Up Display), an instrument panel, or a center console, on the basis of the electrostatic capacitance value sent from the touchpad 20. Such an operation instruction is transmitted via the communication unit 13 to an ECU associated with the HUD, the instrument panel, or the center console.

In addition, the operation determining unit 12 includes a storage unit 121. The storage unit 121 is similar to the storage unit 111, and a detailed description thereof is omitted. Furthermore, the storage unit 121 also stores the electrostatic capacitance threshold value used when determining whether or not the touchpad 20 is being operated (hereinafter, referred to as operation determination).

The operation determining unit 12 performs the operation determination by comparing the electrostatic capacitance value sent from the touchpad 20 with a threshold value stored in the storage unit 121. In addition, if the operation determining unit 12 determines, as a result of the operation determination, that the touchpad 20 is being operated, a first operation determining signal is transmitted to the grip determining unit 11, and if a determination is made that the touchpad 20 is not being operated, a second operation determining signal is transmitted to the grip determining unit 11.

FIG. 2 is a front view of the steering wheel 2 of the steering wheel device 100 according to the present embodiment.

The gripping sensor 21 detects a change in electrostatic capacitance caused by contact between the hand of the driver and the steering wheel 2 (hereinafter referred to as electrostatic capacitance detection). The electrostatic capacitance detection is performed depending on whether or not the touchpad 20 is being operated by the driver. In other words, the gripping sensor 21 performs electrostatic capacitance detection depending on whether the operation determining unit 12 is issuing the first operation determining signal or the second operation determining signal.

The gripping sensor 21 has a plurality of electrodes 2a provided inside the rim part 10 described below. The electrodes 2a are installed into each of three equal portions in the circumferential direction of the rim part 10. The number of electrodes 2a is not limited to three, but may be two or less, or four or more.

The electrode 2a is connected to, for example, a C/V conversion circuit (not depicted) associated with the gripping sensor 21. The C/V conversion circuit applies an AC voltage of a predetermined amplitude to the electrode 2a, for example, and outputs an AC voltage according to the magnitude of the electrostatic capacitance coupled to the electrode 2a. The capacitance measuring circuit detects the electrostatic capacitance coupled to the electrode 2a by detecting the output voltage.

If the steering wheel 2 is not gripped, the electrode 2a is electrically and capacitively coupled to the GND (ground) of the vehicle body or the like via the air in the vehicle compartment. If the steering wheel 2 is being gripped, or in other words, if the hands of the driver are in contact with the rim part 10, the electrode 2a comes close to the hands of the driver and is capacitively coupled with the body of the driver. When the electrode 2a is capacitively coupled to the GND, the electrostatic capacitance becomes very small due to the capacitive coupling with the ground surface. In this regard, the human body has a certain degree of conductivity, so the electrostatic capacitance due to coupling between the body of the driver and the electrode 2a is greater than the electrostatic capacitance due to coupling between the GND and the electrode 2a.

The touchpad 20 is a known device in itself, in which a plurality of drive electrodes and a plurality of detection electrodes are provided crosswise while maintaining insulation on the rear side of an operation surface 201 (see FIG. 2), for example. The touchpad 20 detects a change in electrostatic capacitance caused by the fingertip of the driver touching the operation surface 201. A coordinate system is set on the operation surface 201, and receives an operation such as touching, tapping, and dragging by the fingertip of the driver.

The touchpad 20 scans all the combinations of the drive electrodes and the detection electrodes and detects the electrostatic capacitance for each combination. The touchpad 20 then calculates the coordinates of the position related to the operation based on the threshold value in the storage unit 121. The touchpad 20 periodically outputs detection coordinates representing the calculated coordinates to the operation determining unit 12. The operation determining unit 12 generates an operation instruction for moving a cursor on the UI of the display unit on the basis of the detected coordinates, an operation instruction for selecting any one of the selection keys, and the like.

The touchpad 20 may be a mutual capacitance type touchpad, or may be configured as a self-capacitance type touchpad. In the case of the mutual capacitance method, when a fingertip of the driver touches the operation surface 201, the electrostatic capacitance decreases compared to the case of capacitive coupling to the GND. Furthermore, in the case of the self-capacitance method, the electrostatic capacitance increases when the fingertip of the driver touches the operation surface 201. A case where the touchpad 20 is a mutual capacitance type will be described below as an example.

The steering wheel 2 includes a circular shaped rim part 10 and a hub part 4 provided at the center of the rim part 10 and has an airbag (not depicted) installed therein. In addition, the hub part 4 is connected to the rim part 10 by means of three spoke parts 3.

The rim part 10 is covered with a surface skin material such as leather, and the hub part 4 and spoke parts 3 are covered with, for example, a resin material. As described above, three electrodes 2a are provided on the inside of the rim part 10 along the circumferential direction of the rim part 10. Hereinafter, the case of a rim part 10 having a circular shape will be used for the description, but the rim part of the present invention is not limited to this case. The rim part 10 may be non-circular (for example, D-shaped or C shaped).

In other words, in the circumferential direction of the rim part 10, if the upward and downward directions are set as 12 o'clock and 6 o'clock, and the left and right positions are set as 9 o'clock and 3 o'clock, the spoke parts 3 are provided at the 3 o'clock position, the 6 o'clock position, and the 9 o'clock position in the clockwise direction.

Of the three spoke parts 3, for example, the resin member of the spoke part 3 at the 9 o'clock position is provided with an operation panel 22 having a plurality of operating buttons so that the driver can operate in-vehicle devices such as audio or the like while driving.

In addition, a touchpad 20 is provided on an operating panel 22 provided on the spoke part 3 in the 3 o'clock direction. The touchpad 20 has a substantially rectangular, flat operation surface 201. As described above, the operation surface 201 accepts driver operations such as touching, tapping, and dragging. The touchpad 20 (operation surface 201) is provided near the rim part 10 and extends from the center of the steering wheel 2 to a portion of the spoke part 3.

In the steering wheel device 100 of the present embodiment, the control device 1 (grip determining unit 11) performs grip determination on the basis of the voltage value (electrostatic capacitance) from the gripping sensor 21, as described above.

In the grip determining unit 11, the electrical signal indicating the electrostatic capacitance detected by the gripping sensor 21 is processed by the capacitance measuring circuit to obtain a detected value of the electrostatic capacitance. The grip determining unit 11 compares the acquired detection value (electrostatic capacitance) with a threshold value stored in the storage unit 111.

The grip determining unit 11 performs grip determination as to whether or not the steering wheel 2 is in a gripped state on the basis of the detection value and the threshold value. For example, the grip determining unit 11 determines a non-gripped state if the acquired detection value is less than the threshold value, and determines a gripped state if the acquired detection value is equal to or greater than the threshold value. The result of the grip determination by the grip determining unit 11 is sent to the driving assistance ECU by the communication unit 13.

The driving assistance ECU, which receives a signal indicating the result of the grip determination from the control device 1, executes processes related to driving assistance on the basis of the received result of the grip determination. For example, if grip determination results indicating a hands-off state of the steering wheel 2 are received during autonomous driving, the driving assistance ECU terminates autonomous driving. Note that the driving assistance ECU processing is not limited to autonomous driving and may be lane keep assist, parking assist, or the like.

FIG. 3 is an illustrative diagram depicting an example of operating a touchpad 20 in the steering wheel device 100 of the present embodiment. For convenience, the hands of the driver 200 are depicted by dashed lines in FIG. 3.

As described above, the touchpad 20 is provided close to the rim part 10, so the driver can operate the touchpad 20 with, for example, the tip of a thumb while gripping the rim part 10. In other words, the rim part 10 may be gripped and the touchpad 20 may be operated at the same time.

However, at this time, the hand of the driver comes into contact with both the electrode 2a of the gripping sensor 21 and the electrode of the touchpad 20. In this case, the electrode 2a of the gripping sensor 21 and the electrode of the touchpad 20 are in mutual electrical contact via the hand of the driver. In addition, since both the touchpad 20 and the gripping sensor 21 are devices that measure electrostatic capacitance, there is a possibility that normal measurement may not be possible. Furthermore, this may lead to erroneous determinations in the grip determination and the operation determination, and may cause malfunctions of the UI of the display unit.

In contrast, in the steering wheel device 100 of the present embodiment, the grip determining unit 11 performs grip determination depending on whether or not the touchpad 20 is being operated by the driver, thereby solving the aforementioned problem. The details are described below.

FIG. 4 is a flowchart illustrating the operation determination and grip determination processes in the steering wheel device 100 of the present embodiment.

First, the grip determining unit 11 determines whether or not the engine of the vehicle has started (step S201). The grip determining unit 11 performs a determination by monitoring an ignition signal output for a predetermined period of time when an ignition (ignition device) is ON.

If the grip determining unit 11 determines that the engine of the vehicle has not started (step S201: NO), the determination is repeated. In addition, if the grip determining unit 11 determines that the vehicle engine has started (step S201: YES), grip determination starts based on the result of the electrostatic capacitance detection by the gripping sensor 21 (step S202). In other words, the grip determining unit 11 starts grip determination based on the electrostatic capacitance from the gripping sensor 21.

Thereafter, the grip determining unit 11 transmits the result of the grip determination to the driving assistance ECU or the like via the communication unit 13 until the first operation determining signal is transmitted from the operation determining unit 12.

Furthermore, the operation determining unit 12 monitors the ignition signal to determine whether the vehicle engine has started (step S101). If the operation determining unit 12 determines that the engine of the vehicle has not started (step S101: NO), the determination is repeated. Furthermore, if it is determined that the engine of the vehicle has started (step S101: YES), the operation determining unit 12 starts the operation determination (step S102). In other words, the operation determining unit 12 starts comparing the electrostatic capacitance value sent from the touchpad 20 to the threshold value stored in the storage unit 121.

After starting the operation determination, the operation determining unit 12 determines whether or not the touchpad 20 is being operated (step S103). When the operation determining unit 12 determines that the touchpad 20 is not being operated (step S103: NO), the determination is repeated. Furthermore, if the operation determining unit 12 determines that the touchpad 20 is being operated (step S103: YES), a first operation determining signal is transmitted to the grip determining unit 11 (step S104).

If the grip determining unit 11 receives the first operation determining signal from the operation determining unit 12, the grip determining unit 11 suspends the grip determination being executed (step S203). In other words, the grip determining unit 11 invalidates the electrostatic capacitance sent from the gripping sensor 21.

Next, the grip determining unit 11 determines the grip state as a result of the grip determination, regardless of the result of the electrostatic capacitance detection from the gripping sensor 21 (step S204). The result of this grip determination is transmitted to the driving assistance ECU or the like via the communication unit 13.

Subsequently, the grip determining unit 11 determines whether or not a second operation determining signal has been received from the operation determining unit 12 (step S205). If the grip determining unit 11 determines that the second operation determining signal has not been received from the operation determining unit 12 (step S205: NO), the process returns to step S204, and the grip determining unit 11 sets the result of the grip determination to a gripping state.

On the other hand, after transmitting the first operation determining signal to the grip determining unit 11 in step S104, the operation determining unit 12 determines whether a predetermined period of time has elapsed based on the timing result of a timing unit (not depicted) (step S105).

If the operation determining unit 12 determines that a predetermined period of time has not elapsed since transmitting the first operation determining signal (step S105: NO), the process returns to step S104, and the operation determining unit 12 transmits the first operation determining signal to the grip determining unit 11.

Furthermore, if the operation determining unit 12 determines that a predetermined period of time has elapsed since transmitting the first operation determining signal (step S105: YES), a determination is made as to whether or not the touchpad 20 is being operated (step S106). If the operation determining unit 12 determines that the touchpad 20 is being operated (step S106: YES), the process returns to step S104, and the operation determining unit 12 transmits a first operation determining signal to the grip determining unit 11.

In other words, after transmitting the first operation determining signal, the operation determining unit 12 periodically repeats the determination of whether or not the touchpad 20 is being operated, and if a determination is made that the touchpad 20 is being operated, continues to transmit the first operation determining signal to the grip determining unit 11.

On the other hand, if the operation determining unit 12 determines that the touchpad 20 is not being operated (step S106: NO), a second operation determining signal is transmitted to the grip determining unit 11 (step S107). Thereafter, the process ends.

Therefore, when the second operation determining signal is sent from the operation determining unit 12, the grip determining unit 11 determines that the second operation determining signal has been received (step S205: YES). When a determination is made that the second operation determining signal has been received, the grip determining unit 11 resumes the suspended grip determination (step S206). In other words, the grip determining unit 11 resumes grip determination based on the electrostatic capacitance from the gripping sensor 21. Thereafter, the process ends.

The aforementioned process is repeated, for example, until the engine of the vehicle is stopped.

In the steering wheel device 100 of the present embodiment, as described above, when the operation determining unit 12 emits the first operation determining signal, or in other words, when the driver is operating the touchpad 20, the grip determining unit 11 suspends the grip determination, and when the operation determining unit 12 emits the second operation determining signal, or in other words, when the driver stops operating the touchpad 20, the grip determining unit 11 resumes the grip judgment. Therefore, the gripping sensor 21 does not perform electrostatic capacitance detection while the driver is operating the touchpad 20, and is disabled. Therefore, a problem can be prevented beforehand in which normal electrostatic capacitance measurement is not possible due to electrical contact between the electrode 2a of the gripping sensor 21 and the electrode of the touchpad 20 via the hand of the driver.

Furthermore, with the steering wheel device 100 of the present embodiment, as described above, when the first operation determining signal is transmitted and the grip determination by the grip determining unit 11 is suspended, the grip determining unit 11 uniformly sets the result of the grip determination to a grip state, regardless of the result of the electrostatic capacitance detection from the gripping sensor 21. In this case, since the driver operates the touchpad 20 with a fingertip while gripping the rim part 10 (see FIG. 3), the gripping determination can be appropriately determined to be a gripping state. Therefore, even if the grip determination is suspended, an appropriate grip determination result can be output to a driving assistance ECU, or the like.

Furthermore, in the steering wheel device 100 of the present embodiment, the control device 1 is built-in, so an in-vehicle LAN is not used. This reduces the strain on the data communication band of the vehicle-mounted LAN and improves responsiveness.

Note that in the foregoing, the control device 1 is provided on the steering wheel 2, but the present invention is not limited to this case. For example, the control device 1 may be provided on the main body side (for example, a controller) of the corresponding vehicle.

EXPLANATION OF CODES

1. Control device
2. Steering wheel

10. Rim part
11. Grip determining unit
12. Operation determining unit
13. Communication unit
20. Touchpad
21. Gripping Sensor
100. Steering wheel device

The invention claimed is:

1. An occupant state detecting device, comprising:
a steering wheel having a touchpad operable using electrostatic capacitance and a gripping sensor for detecting whether a driver is gripping a rim part;
an operation determining unit for performing operation determination as to whether the touchpad is being operated; and
a grip determining unit for performing a grip determination as to whether the rim part of the steering wheel is being gripped,
   wherein the operation determining unit transmits a first operation determining signal to the grip determining unit when a determination is made that the touchpad is being operated, and
   the grip determining unit suspends grip determination when the first operation determining signal is received.

2. The occupant state detecting device according to claim 1, wherein the touchpad is provided in a portion of a region extending from a center portion of the steering wheel to a spoke part.

3. The occupant state detecting device according to claim 1, wherein the grip determining unit is provided on the steering wheel.

4. The occupant state detecting device according to claim 1, wherein the operation determining unit is provided on the steering wheel.

5. The occupant state detecting device according to claim 1, wherein the operation determining unit transmits a second operation determining signal to the grip determining unit when a determination is made that the touchpad has not been operated after transmitting the first operation determining signal; and
   the grip determining unit resumes grip determination when the second operation determining signal is received.

6. The occupant state detecting device according to claim 1, wherein the grip determining unit determines that the rim part is being gripped when the first operation determining signal is received.

7. The occupant state detecting device according to claim 1, wherein the grip determining unit and the operation determining unit are provided on the steering wheel.

8. The occupant state detecting device according to claim 1, wherein occupant state detecting device is configured to operate during driving.

9. A non-transitory computer readable recording medium that stores a program for causing a computer to execute a process that performs an operation determination as to whether a touchpad operable using electrostatic capacitance provided on a steering wheel is being operated and a grip determination as to whether the rim part of the steering wheel is being gripped, wherein the grip determination is suspended when the operation determination detects that the touchpad is being operated.

* * * * *